United States Patent
Hibi

(10) Patent No.: US 7,969,132 B2
(45) Date of Patent: Jun. 28, 2011

(54) SWITCHING POWER SUPPLY UNIT AND CONTROL METHOD OF SWITCHING POWER SUPPLY UNIT

(75) Inventor: Yasuhiro Hibi, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 505 days.

(21) Appl. No.: 11/892,341

(22) Filed: Aug. 22, 2007

(65) Prior Publication Data

US 2008/0061754 A1 Mar. 13, 2008

(30) Foreign Application Priority Data

Sep. 7, 2006 (JP) ................................ 2006-242813

(51) Int. Cl.
*G05F 1/00* (2006.01)
(52) U.S. Cl. ......................... 323/282; 323/283; 323/284
(58) Field of Classification Search .................. 323/223, 323/224, 241, 271, 282–285; 363/19, 20, 363/26, 80, 97; 332/108, 109, 119
See application file for complete search history.

(56) References Cited

U.S. PATENT DOCUMENTS

| RE37,609 | E * | 3/2002 | Bittner ........................... 323/272 |
| 6,489,756 | B2 * | 12/2002 | Kanouda et al. ............... 323/284 |
| 7,061,213 | B2 * | 6/2006 | Yoshida ......................... 323/224 |
| 7,109,693 | B2 * | 9/2006 | Yoshida et al. ................ 323/282 |
| 7,116,089 | B1 * | 10/2006 | Nguyen et al. ................ 323/284 |
| 7,173,404 | B2 * | 2/2007 | Wu ................................ 323/283 |
| 7,439,720 | B2 * | 10/2008 | Nguyen et al. ................ 323/284 |
| 7,679,346 | B2 * | 3/2010 | Lin et al. ....................... 323/282 |

FOREIGN PATENT DOCUMENTS

JP 2004-096982 3/2004

\* cited by examiner

*Primary Examiner* — Adolf Berhane
*Assistant Examiner* — Emily Pham
(74) *Attorney, Agent, or Firm* — Foley & Lardner LLP

(57) ABSTRACT

Decrease in a voltage supplied to a load caused by load fluctuations is minimized. A pulse frequency modulated signal generating unit 13 outputs a signal PFMOUT having a pulse frequency modulated according to a voltage supplied to the load 20. A pulse width modulated signal generating unit 14 outputs a signal PWMOUT having a pulse width modulated according to a voltage supplied to the load 20. In a state where the signal PFMOUT is selected, a selection unit 17 refers to a determination result of a frequency determining unit 15 and selects the signal PWMOUT as on/off signal for a semiconductor switch 11 when a low-level period in one cycle of the signal PFMOUT is not more than a predetermined time period. In a state where the signal PWMOUT is selected, the selection unit 17 selects the signal PFMOUT as on/off signal for the semiconductor switch 11 when a voltage determining unit 16 detects that a DC voltage (VOUT) at the load 20 exceeds a predetermined voltage.

11 Claims, 3 Drawing Sheets

SWITCHING POWER SUPPLY UNIT AND CONTROL METHOD OF SWITCHING POWER SUPPLY UNIT

REFERENCE TO RELATED APPLICATIONS

The present application is claiming the priority of the earlier Japanese patent application No. 2006-242813 filed on Sep. 07, 2006, the entire disclosure thereof being incorporated herein by reference thereto.

FIELD OF THE INVENTION

The present invention relates to a switching power supply unit and control method of a switching power supply unit, and particularly to a switching power supply unit and control method that perform switching using a pulse width modulated signal and a pulse frequency modulated signal.

BACKGROUND OF THE INVENTION

Switching power supply units, also known as DC-DC converters, are widely used in various electric and electronic apparatuses. Stability in output voltage against a wide range of input voltage and load fluctuations is often demanded from such switching power supply units. Power supply units that select either a pulse width modulated signal or a pulse frequency modulated signal during switching operation, and perform switching using the selected signal in order to stably control output voltage are known.

For instance, a DC-DC converter that selects a pulse frequency modulated signal when a load current flowing through the load is below a predetermined value and selects a pulse width modulated signal, irrespective of a value of the load current, when a level of the DC voltage supplied to the load changes is disclosed in Patent Document 1. In the case where the load becomes increasingly heavy in such a DC-DC converter, the output voltage to the load decreases and it is controlled so that a pulse width modulated signal is selected as a switching signal when the output voltage is below a predetermined voltage value. In other words, the decrease in the output voltage triggers the selection of the pulse width modulated signal in order to supply more power to the load.

[Patent Document 1]
Japanese Patent Kokai Publication No. JP-P2004-96982A

SUMMARY

The following analysis is given by the present invention. The entire disclosures of the above mentioned Patent Document 1 is herein incorporated by reference thereto.

In many electronic apparatuses, it is demanded that changes in output voltage caused by load fluctuations should be minimized. Particularly recent electronic apparatuses operating with low voltage power supplies, for instance mobile communication terminal devices, do not have much tolerance for a decrease in power supply voltage despite the fact that the load fluctuates greatly. In such an electronic device, the technology disclosed in Patent Document 1, in which a pulse width modulated signal selected as a switching signal when the output voltage is below a predetermined voltage value, cannot sufficiently suppress the decrease in output voltage caused by load fluctuations. In other words, since the selection of the pulse width modulated signal is triggered by a decrease in output voltage, a temporal decrease in output voltage cannot be avoided.

According to an aspect of the present invention, there is provided a switching power supply unit that selects a first signal whose pulse frequency is modulated according to a voltage supplied to a load or a second signal whose pulse width is modulated according to a voltage supplied to the load, switches on/off a semiconductor switch using the selected signal, and supplies a direct-current voltage converted into a predetermined voltage level to the load. This switching power supply unit comprises a frequency determining unit that determines whether or not the frequency of the first signal exceeds a predetermined value a selection unit that selects the first or the second signal according to the determination result of the frequency determining unit.

According to another aspect of the present invention, there is provided a control method for a switching power supply unit. The control method for a switching power supply unit selects a first signal whose pulse frequency is modulated according to a voltage supplied to a load or a second signal whose pulse width is modulated according to a voltage supplied to the load, switches on/off a semiconductor switch using the selected signal, and supplies a direct-current voltage converted into a predetermined voltage level to the load. This method includes determining of whether or not the frequency of the first signal exceeds a predetermined value wherein selecting of the first or the second signal is performed according to the determination result.

The meritorious effects of the present invention are summarized as follows.

According to the present invention, a switching power supply unit selects a signal that switches on/off a semiconductor switch by determining whether or not the frequency of a pulse frequency modulated signal exceeds a predetermined value. Therefore, a decrease in output voltage caused by load fluctuations can be minimized since a pulse width modulated signal is selected in order to supply more power to the load without having to wait for a decrease in output voltage as a trigger.

PREFERRED MODES OF THE INVENTION

In the switching power supply unit, it is preferred that the first signal is a binary signal having first and second levels; the semiconductor switch is switched on corresponding to a period of the first level; the frequency determining unit determines whether or not a period of the second level in one cycle of the first signal is equal to or less than a predetermined time period; and the selection unit selects the second signal when the period of the second level is equal to or less than the predetermined time period in a state where the first signal is selected.

Also, it is preferred that the selection unit selects the first signal when the direct current voltage exceeds a predetermined voltage in a state where the second signal is selected.

Further, it is preferred that the frequency determining unit comprises: an integrating circuit that performs an integration operation during a period of the second level and resets the integration contents during a period of the first level; and a comparator circuit that compares a voltage outputted by the integrating circuit with a reference voltage; wherein the frequency determining unit determines the length of the period of the second level according to the comparison result outputted by the comparator circuit.

In the control method for a switching power supply unit, it is preferred that the first signal is a binary signal having first and second levels, and the semiconductor switch is switched on corresponding to a period of the first level; in the determining, whether or not a period of the second level in one cycle of the first signal is equal to or less than a predetermined time period is determined; and in the selecting, the second signal is selected when the period of the second level is equal to or less than the predetermined time period in a state where the first signal is selected.

In the control method, it is preferred that the first signal is selected when the direct current voltage exceeds a predetermined voltage in a state where the second signal is selected.

In a preferred mode, there is provided a switching power supply unit, comprising: a selection unit that selects a first signal whose pulse frequency is modulated according to a voltage supplied to a load or a second signal whose pulse width is modulated according to a voltage supplied to the load; a switching unit that switches on/off a semiconductor switch using the selected signal; and a loading unit that supplies a direct-current voltage converted into a predetermined voltage level to the load; and a frequency determining unit that determines whether or not the frequency of the first signal exceeds a predetermined value; wherein the selection unit selects the first or second signal according to the determination result of the frequency determining unit.

Figure 1:
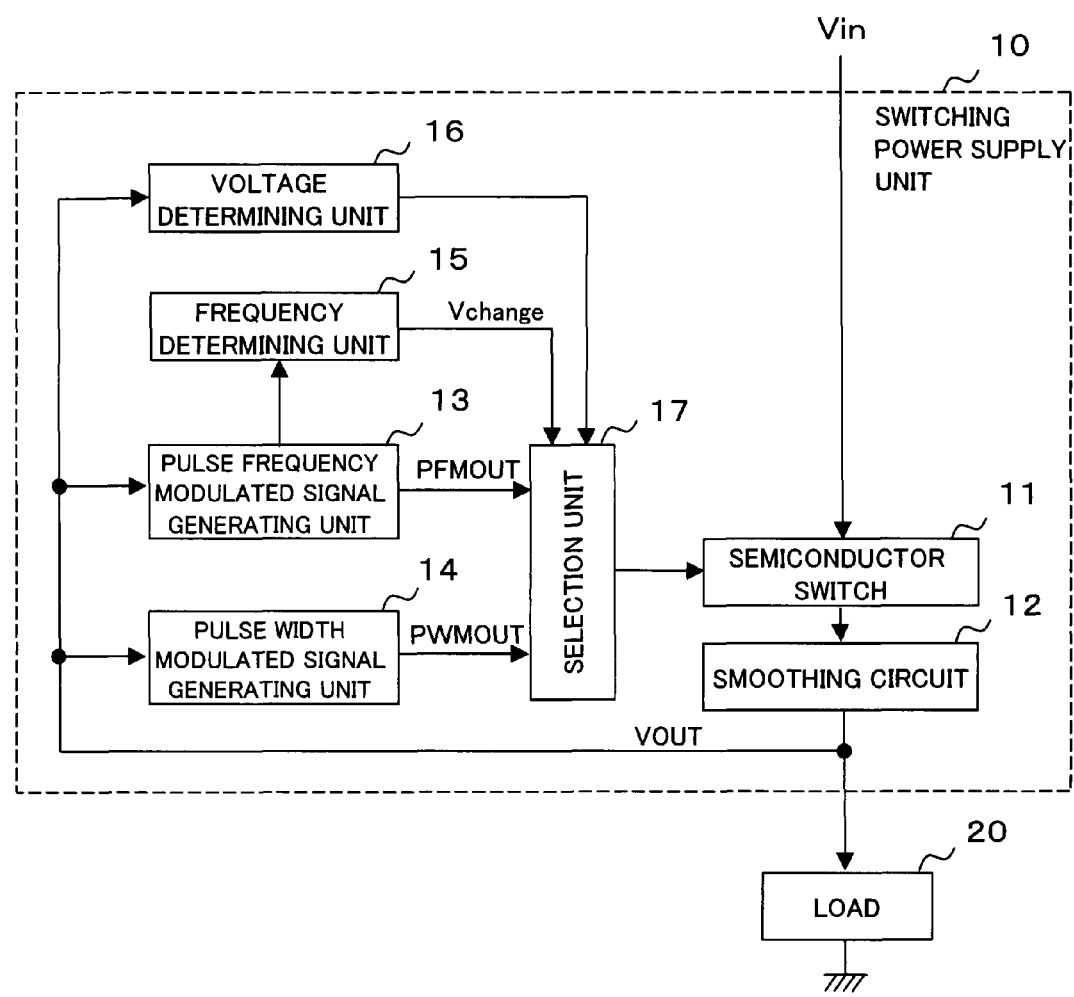
FIG. 1 is a block diagram showing the configuration of a switching power supply unit relating to an example of the present invention.

FIG. 1 is a block diagram showing the configuration of a switching power supply unit relating to an example of the present invention. In FIG. 1, the switching power supply unit 10 comprises a semiconductor switch 11, a smoothing circuit 12, a pulse frequency modulated signal generating unit 13, a pulse width modulated signal generating unit 14, a frequency determining unit 15, a voltage determining unit 16, and a selection unit 17. The switching power supply unit 10 converts a DC voltage Vin into a predetermined voltage level (VOUT) and supplies it to a load 20.

The pulse frequency modulated signal generating unit 13 outputs a signal PFMOUT whose pulse frequency is modulated according to the voltage supplied to the load 20. Further, the pulse width modulated signal generating unit 14 outputs a signal PWMOUT whose pulse width is modulated according to the voltage supplied to the load 20. The selection unit 17 selects the signal PFMOUT outputted by the pulse frequency modulated signal generating unit 13 or the signal PWMOUT outputted by the pulse width modulated signal generating unit 14, and switches on/off the semiconductor switch 11 using the selected signal. The DC voltage Vin switched on/off by the semiconductor switch 11 is smoothed by the smoothing circuit 12, converted into a predetermined voltage level, and supplied to the load 20 as a DC voltage (VOUT). The signals PFMOUT and PWMOUT are binary signals, and for instance, the semiconductor switch 11 is switched on corresponding to a high level period and switched off corresponding to a low level period.

The frequency determining unit 15 determines whether or not the low-level period in one cycle of the signal PFMOUT is equal to or less than a predetermined time period, i.e., whether or not the frequency of the signal PFMOUT is higher than a predetermined value. For instance, whether or not the frequency of the pulse frequency modulated signal is more than a predetermined value is determined by performing an integration operation by an integrating circuit during the low-level (second level) period of the signal PFMOUT, resetting an integration content during the high-level (first level) period, and comparing a voltage that is the result of the integration content outputted by the integrating circuit with a reference voltage.

The voltage determining unit 16 determines whether or not the DC voltage (VOUT) at the load 20 has exceeded a predetermined voltage.

In a state where the signal PFMOUT is selected, the selection unit 17 refers to the determination result of the frequency determining unit 15 and selects the signal PWMOUT as an on/off signal for the semiconductor switch 11 when the low-level period in one cycle of the signal PFMOUT is not longer than a predetermined time period. Further, in a state where the signal PWMOUT is selected, the selection unit 17 selects the signal PFMOUT as an on/off signal for the semiconductor switch 11 when the voltage determining unit 16 detects that the DC voltage (VOUT) at the load 20 has exceeded a predetermined voltage, and controls so that the semiconductor switch 11 is switched on/off by the selected signal.

The switching power supply unit 10 configured as described selects the signal that switches on/off the semiconductor switch 11 by determining whether or not the frequency of the signal PFMOUT has exceeded a predetermined value. In other words, by detecting a signal in a feedback system of the pulse frequency modulated signal generating unit 13, the signal PWMOUT can be selected as a signal that switches on/off the semiconductor switch 11 before the load decreases the output voltage. Therefore, the decrease in output voltage caused by load fluctuations can be minimized since the signal PWMOUT is selected in order to supply more power to the load without having to wait for a decrease in output voltage as a trigger.

EXAMPLE 1

Figure 2:
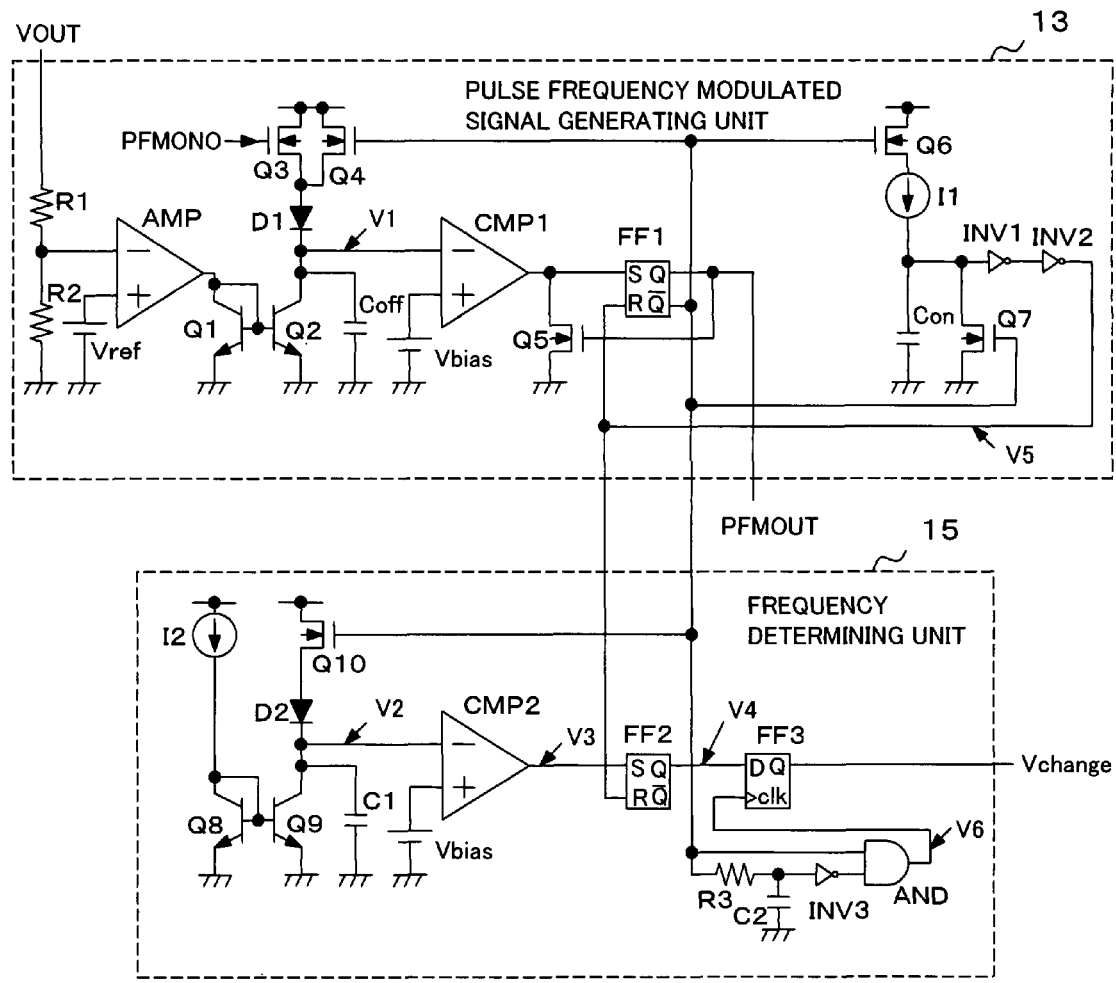
FIG. 2 is a circuit diagram of a pulse frequency modulated signal generating unit and a frequency determining unit relating to an example of the present invention.

FIG. 2 is a circuit diagram of the pulse frequency modulated signal generating unit and the frequency determining unit relating to an example of the present invention. In FIG. 2, the pulse frequency modulated signal generating unit 13 comprises NPN transistors Q1 and Q2, PMOS transistors Q3, Q4, and Q6, NMOS transistors Q5 and Q7, a diode D1, an amplifier AMP, a comparator CMP1, inverter circuits INV1 and INV2, a flip-flop circuit FF1, a current source I1, resistors R1 and R2, capacitors Con and Coff, and voltage sources Vref and Vbias.

The amplifier AMP amplifies a difference between a voltage obtained by having the serially-connected resistors R1 and R2 divide the voltage VOUT at the load and a voltage at the voltage source Vref, and supplies the amplified result to a current mirror constituted by the NPN transistors Q1 and Q2. While one end of the capacitor Coff is grounded, a voltage V1 at the other end is rapidly charged from the PMOS transistor Q4 via the diode D1 when the PMOS transistor Q4 is turned on, and gradually discharged by the NPN transistor Q2 constituting the current mirror. The comparator CMP1 compares the voltage V1 with a voltage at the voltage source Vbias and outputs a high level to a set input S of the flip-flop circuit FF1 when the voltage V1 is below the voltage at the voltage source Vbias, setting the flip-flop circuit FF1. Further, in an initial state, a signal PFMONO is at a low level and the PMOS transistor Q3 is turned on, charging the capacitor Coff, however, during normal operation, the PMOS transistor Q3 is turned off and does not have any influence on the other elements.

An output Q of the flip-flop circuit FF1 outputs the signal PFMOUT, which is a pulse frequency modulated signal. As soon as the flip-flop circuit FF1 is set, the signal PFMOUT becomes a high level and the NMOS transistor Q5 is turned on, turning the set input S to a low level. Further, the output/Q, the complement of Q of the flip-flop circuit FF1, goes to a low level, the PMOS transistors Q4 and Q6 are turned on, and the NMOS transistor Q7 is turned off. When the PMOS transistor Q6 is turned on, the capacitor Con is charged by the current source I1, and once the potential of the capacitor Con exceeds the threshold of the inverter circuit INV1, an output V5 of the inverter circuit INV2 connected to the inverter circuit INV1 in a cascade fashion goes to a high level. As a result, the flip-flop circuit FF1 is reset, the PMOS transistors Q4 and Q6 are turned off, and the NMOS transistor Q7 is turned on. Due to the fact that the PMOS transistor Q4 is turned off, the voltage V1 of the capacitor Coff is gradually discharged by the NPN transistor Q2 constituting the current mirror, and decreases.

Next, the frequency determining unit 15 will be described. The frequency determining unit 15 comprises NPN transistors Q8 and Q9, a PMOS transistor Q10, a diode D2, a comparator CMP2, an inverter circuit INV3, an AND circuit AND, flip-flop circuits FF2 and FF3, a current source 12, a resistor R3, a capacitor C2, and a voltage source Vbias.

The current from the current source 12 is supplied to a current mirror constituted by the NPN transistors Q8 and Q9. A voltage V2 of the capacitor C1, whose one end is grounded, is rapidly charged via the diode D2 when the complement output/Q of the flip-flop circuit FF1 goes to a low level, thereby turning the PMOS transistor Q10 on, and is gradually discharged by the NPN transistor Q9 constituting the current mirror. In other words, the voltage V2 during the period T1 corresponds to an integration content of an integration operation during a period of the low-level (second level) of the signal PFMOUT, the voltage V2 during the period T2 corresponds to a reset level that the integration contents is reset during a period of the high-level (first level) of the signal PFMOUT. The comparator CMP2 compares the voltage V2 with the voltage at the voltage source Vbias and outputs a high level to a set input S of the flip-flop circuit FF2 when the voltage V2 is below the voltage at the voltage source Vbias, setting the flip-flop circuit FF2. The flip-flop circuit FF2 is reset when the output V5 of the inverter circuit INV2 goes to a high level. The output Q of the flip-flop circuit FF2 is connected to a latch input D of the D-type flip-flop circuit FF3.

The complement output/Q of the flip-flop circuit FF1 is connected to one end of the resistor R3 and one of input ends of the AND circuit AND, and the other end of the resistor R3 is connected to one end of the capacitor C2, whose other end is grounded, and the other input end of the AND circuit AND. A pulse signal V6 corresponding to the rising edge of the signal PFMOUT is outputted from an output end of the AND circuit AND, and this pulse signal V6 is supplied to a clock input terminal of the flip-flop circuit FF3. The flip-flop circuit FF3 latches a signal V4 outputted from the flip-flop circuit FF2 using the pulse signal V6 and outputs it as a signal Vchange to the selection unit 17. The selection unit 17 selects the signal PFMOUT, which is a pulse frequency modulated signal, when the signal Vchange is at a high level, and selects the signal PWMOUT, which is a pulse width modulated signal, when the signal Vchange is at a low level.

Figure 3:
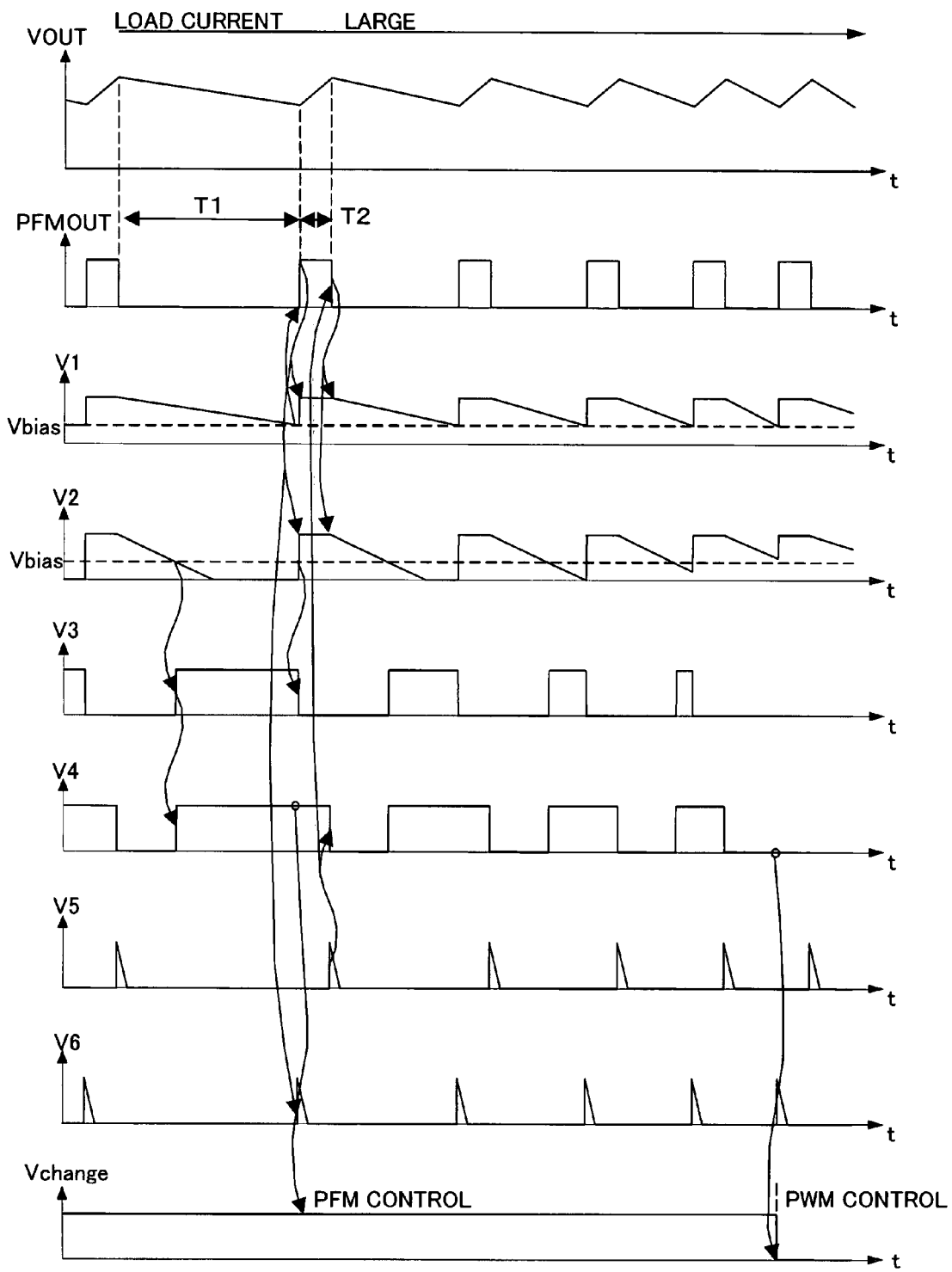
FIG. 3 is a chart showing the timing of main signals of the pulse frequency modulated signal generating unit and the frequency determining unit relating to an example of the present invention.

Next, the timing chart of the pulse frequency modulated signal generating unit 13 and the frequency determining unit 15 operating as described above will be described. FIG. 3 is a chart showing the timing of main signals of the pulse frequency modulated signal generating unit and the frequency determining unit relating to an example of the present invention. In FIG. 3, the signal PFMOUT is a pulse frequency modulated signal that controls to switch on/off the semiconductor switch 11, and it switches on the semiconductor switch 11 during a high-level period T2, raising the voltage VOUT. Further, during a low-level period T1, the semiconductor switch 11 is switched off, lowering the voltage VOUT.

The voltage V1 of the capacitor Coff is maintained at approximately a power supply voltage by the PMOS transistor Q4, which is turned on during the period T2. Further, the PMOS transistor Q4 is turned off during the period Ti, and the electric charge of the capacitor Coff is gradually discharged via the NPN transistor Q2 with a time constant corresponding to the average voltage of the voltage VOUT, lowering the voltage V1. In other words, the period T1 is determined by the ratio between the capacity of the capacitor Coff and the current flowing through the NPN transistor Q2. Further, the period T2 is determined by the ratio between the capacity of the capacitor Con and the current from the current source I1.

The voltage V2 of the capacitor C1 is maintained at approximately a power supply voltage by the PMOS transistor Q10, which is turned on during the period T2. Further, the PMOS transistor Q10 s turned off during the period T1, the electric charge of the capacitor C1 is gradually discharged via the NPN transistor Q9 with a time constant determined by the ratio between the capacity of the capacitor C1 and the current from the current source 12, and the voltage V2 reaches the ground potential if the period T1 is longer enough.

The pulse signal V3 goes to a high level or a low level depending on whether the voltage V2 is below or above the voltage at the voltage source Vbias. The pulse signal V4 goes to a high level when the voltage V2 is below the voltage at the voltage source Vbias and goes to a low level at the last timing of the period T2.

A pulse signal V5 is a signal indicating the last timing of the period T2. Further, the pulse signal V6 is a signal indicating the first timing of the period T2. The signal Vchange is a signal that holds the level of the pulse signal V4 at the rising edge of the pulse signal V6.

Using the timing chart described above, now consider a case where the load current gradually increases. The period T2 does not change because it is determined by the ratio between the capacity of the capacitor Con and the current from the current source 11. On the other hand, the period T1 becomes shorter as the average voltage of the voltage VOUT drops because it is determined by a time constant corresponding to the capacity of the capacitor Coff and the average voltage of the voltage VOUT. Meanwhile, the down slope of the signal V2 has a fixed shape since it corresponds to a time constant determined by the ratio between the capacity of the capacitor C1 and the current from the current source 12. Therefore, when the period T1 becomes shorter than a predetermined value, the minimum potential of the signal V2 is no longer below the voltage at the voltage source Vbias and the flip-flop circuits FF2 and FF3 remain reset. Because of this, the signal Vchange changes from a high level to a low level. In other words, the signal PWMOUT is selected as the on/off signal for the semiconductor switch 11 in place of the signal PFMOUT.

In such a case where the load current gradually increases, the frequency determining unit 15 operates as described above and the selection unit 17 selects the signal PWMOUT in place of the signal PFMOUT in FIG. 1. Therefore, a decrease in the output voltage caused by the fluctuations of the load 20 can be suppressed because the signal PWMOUT is selected in order to supply more power to the load 20 as soon as the frequency of the signal PFMOUT increases. When the load current gradually decreases in a state where the signal PWMOUT is selected, it may be configured so that the selection unit 17 selects the signal PFMOUT when the voltage determining unit 16 detects that the DC voltage at the load 20 exceeds a predetermined voltage.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A switching power supply unit, wherein
said switching power supply unit selects a first signal whose pulse frequency is modulated according to a voltage supplied to a load or a second signal whose pulse width is modulated according to a voltage supplied to said load, switches on/off a semiconductor switch using the selected signal, and supplies a direct-current voltage converted into a predetermined voltage level to said load,
said switching power supply unit comprising:
a frequency determining unit that determines whether or not the frequency of said first signal exceeds a predetermined value; and
a selection unit that selects said first or second signal according to the determination result of said frequency determining unit,
wherein said first signal is a binary signal having first and second levels;
said semiconductor switch is switched on corresponding to a period of said first level;
said frequency determining unit determines whether or not a period of said second level in one cycle of said first signal is equal to or less than a predetermined time period; and
said selection unit selects said second signal when said period of said second level is equal to or less than the predetermined time period in a state where said first signal is selected.

2. The switching power supply unit as defined in claim 1, wherein said selection unit selects said first signal when said direct current voltage exceeds a predetermined voltage in a state where said second signal is selected, irrespective as to the selection made by said selection unit.

3. The switching power supply unit as defined in claim 1, wherein said frequency determining unit comprises:
an integrating circuit that performs an integration operation during a period of said second level and resets the integration contents during a period of said first level; and
a comparator circuit that compares a voltage outputted by said integrating circuit with a reference voltage; wherein
said frequency determining unit determines the length of said period of said second level according to a comparison result outputted by said comparator circuit.

4. A control method of switching a power supply unit comprising:
selecting a first signal whose pulse frequency is modulated according to a voltage supplied to a load or a second signal whose pulse width is modulated according to a voltage supplied to said load,
switching on/off a semiconductor switch using the selected signal, and
supplying a direct-current voltage converted into a predetermined voltage level to said load; and
determining whether or not the frequency of said first signal exceeds a predetermined value; wherein
said first or second signal is selected according to a determination result of said determining step,
wherein said first signal is a binary signal having first and second levels, and said semiconductor switch is switched on corresponding to a period of said first level,
wherein in said determining step, whether or not a period of said second level in one cycle of said first signal is equal to or less than a predetermined time period is determined, and
wherein in said selecting step, said second signal is selected when said period of said second level is equal to or less than the predetermined time period in a state where said first signal is selected.

5. The control method as defined in claim 4, further including: selecting said first signal when said direct current voltage exceeds a predetermined voltage in a state where said second signal is selected, irrespective as to the selection made by said selection unit.

6. A switching power supply unit, comprising:
a selection unit that selects a first signal whose pulse frequency is modulated according to a voltage supplied to a load or a second signal whose pulse width is modulated according to a voltage supplied to said load;
a switching unit that switches on/off a semiconductor switch using the selected signal, said semiconductor switch supplying a direct-current voltage to a load; and
a frequency determining unit that determines whether or not the frequency of said first signal exceeds a predetermined value; wherein
said selection unit selects said first or second signal according to a determination result of said frequency determining unit, wherein said first signal is a binary signal having first and second levels,
said semiconductor switch is switched on corresponding to a period of said first level;
said frequency determining unit determines whether or not a period of said second level in one cycle of said first signal is equal to or less than a predetermined time period; and
said selection unit selects said second signal when said period of said second level is equal to or less than the predetermined time period in a state where said first signal is selected.

7. The switching power supply unit as defined in claim 6, wherein said selection unit selects said first signal when said direct current voltage exceeds a predetermined voltage in a state where said second signal is selected, irrespective as to the selection made by said selection unit.

8. The switching power supply unit as defined in claim 6, wherein said frequency determining unit comprises:
an integrating circuit that performs an integration operation during a period of said second level and resets the integration contents during a period of said first level; and
a comparator circuit that compares a voltage outputted by said integrating circuit with a reference voltage; wherein
said frequency determining unit determines the length of said period of said second level according to a comparison result outputted by said comparator circuit.

9. The switching power supply unit as defined in claim 3, wherein said frequency determining unit further comprises:

an S-R flip-flop having an S-input connected to an output of said comparator circuit; and a D flip-flip connected to an output of said S-R flip-flop, wherein an R-input of said S-R flip-flop is connected to an R-input of an S-R flip-flop of a PFM signal generating unit.

10. The switching power supply unit as defined in claim 8, wherein said frequency determining unit further comprises:

an S-R flip-flop having an S-input connected to an output of said comparator circuit; and a D flip-flip connected to an output of said S-R flip-flop, wherein an R-input of said S-R flip-flop is connected to an R-input of an S-R flip-flop of a PFM signal generating unit.

11. The switching power supply unit according to claim 1, further comprising:

a pulse frequency modulated signal generating unit generating the first signal; and a pulse width modulated signal generating unit generating the second signal, wherein the selection unit is coupled to the pulse frequency modulated signal generating unit and the frequency determining unit, and outputs the first signal or the second signal according to the determination result of the frequency determining unit, and wherein the semiconductor switch is coupled to the selection unit and is switched by the outputted signal from the selection unit.

\* \* \* \* \*